United States Patent
Maheshwari et al.

(10) Patent No.: US 11,636,476 B2
(45) Date of Patent: Apr. 25, 2023

(54) SYSTEM AND METHOD FOR CARRYING OUT TWO FACTOR AUTHENTICATION USING AUGMENTED/VIRTUAL REALITY

(71) Applicant: MASTERCARD ASIA/PACIFIC PTE. LTD., Singapore (SG)

(72) Inventors: Rajat Maheshwari, Singapore (SG); Sunitha Miryala, Singapore (SG); Philip Wei Ping Yen, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 590 days.

(21) Appl. No.: 16/605,431

(22) PCT Filed: Apr. 18, 2018

(86) PCT No.: PCT/SG2018/050192
§ 371 (c)(1),
(2) Date: Oct. 15, 2019

(87) PCT Pub. No.: WO2018/194518
PCT Pub. Date: Oct. 25, 2018

(65) Prior Publication Data
US 2020/0051080 A1    Feb. 13, 2020

(30) Foreign Application Priority Data
Apr. 21, 2017   (SG) .............................. 10201703299T

(51) Int. Cl.
*G06Q 20/40*     (2012.01)
*G06Q 20/12*     (2012.01)
(Continued)

(52) U.S. Cl.
CPC ............. *G06Q 20/40* (2013.01); *G06Q 20/12* (2013.01); *G06Q 20/20* (2013.01); *G06Q 20/36* (2013.01); *G06Q 20/385* (2013.01); *G06T 19/006* (2013.01)

(58) Field of Classification Search
CPC ...... G06Q 20/40; G06Q 20/20; G06Q 20/385; G06Q 20/12; G06Q 20/36; G06T 19/006
See application file for complete search history.

(56) References Cited

U.S. PATENT DOCUMENTS 9,146,669 B2    9/2015  Kim et al.
2007/0220597 A1*  9/2007  Ishida .................. G06Q 20/425
                                                        726/8
(Continued)

FOREIGN PATENT DOCUMENTS

CN    103136462 A    6/2013
JP    2016-119095 A    6/2016

OTHER PUBLICATIONS

PCT/SG2018/050192: PCT International Search Report and Written Opinion (11 pages) of PCT Patent Application No. PCT/SG2018/050192, dated Jul. 4, 2018, to which the instant application claims priority.

*Primary Examiner* — Scott C Anderson
(74) *Attorney, Agent, or Firm* — Pramudji Law Group PLLC; Ari Pramudji

(57) ABSTRACT

There is provided a method and system for carrying out two factor authentication, which renders an augmented reality environment or a virtual reality environment at the user device to depict an authentication object, and when a user interaction with the authentication object is detected, an authentication code received from an issuer server is displayed at the user device.

15 Claims, 7 Drawing Sheets

(51) Int. Cl.
  *G06Q 20/20* (2012.01)
  *G06Q 20/36* (2012.01)
  *G06Q 20/38* (2012.01)
  *G06T 19/00* (2011.01)

(56) References Cited

U.S. PATENT DOCUMENTS

| | | |
|---|---|---|
| 2013/0139248 A1 | 5/2013 | Rhee et al. |
| 2015/0339670 A1 | 11/2015 | Shaked et al. |
| 2016/0253510 A1 | 9/2016 | Lim |
| 2018/0124599 A1* | 5/2018 | Werner ............... H04L 63/0853 |
| 2018/0150812 A1* | 5/2018 | Kurian .................. G07F 19/203 |
| 2019/0244192 A1* | 8/2019 | Katzin .................... G06Q 20/36 |
| 2020/0287898 A1* | 9/2020 | Weaver ................. H04L 9/3239 |

* cited by examiner

US 11,636,476 B2

SYSTEM AND METHOD FOR CARRYING OUT TWO FACTOR AUTHENTICATION USING AUGMENTED/VIRTUAL REALITY

CROSS-REFERENCE TO RELATED APPLICATIONS

This application is a U.S. national stage filing under 35 U.S.C. § 371 of International Application No. PCT/SG2018/050192, filed on Apr. 18, 2018, which claims the benefit of, and priority to, Singapore Application No. 10201703299T, filed on Apr. 21, 2017. The entire disclosures of the above applications are incorporated herein by reference.

FIELD OF THE INVENTION

The present invention relates to a system and method for carrying out a two factor authentication using augmented/virtual reality.

BACKGROUND OF INVENTION

Currently, messaging software applications such as, for example, Whatsapp, Viber, Line, Facebook Messenger, and so forth are reducing the reliance on SMS services and infrastructure which have been set up by telecommunications companies. Despite SMS services no longer being preferred by users, banks and other entities still make frequent use of SMS services for providing second factor authentication (also known as two-factor authentication or 2FA) codes to enable authentications to be carried out securely. However, there are limitations in relation to the use of SMS services to provide second factor authentication codes.

One limitation is the need for a user's mobile phone to be kept in range of a cellular network whenever authentications need to be carried out. Thus, when the user is in an area with poor/no network connectivity, for example, on a flight, at a rural area and so forth, the user will encounter difficulties when attempting to receive authentication codes.

Furthermore, a user is required to share their mobile number with an entity carrying out, in part or completely, the authentications. This may lead to issues like undesired solicitation calls, loss of privacy, a need to update the entity of changes to the user's mobile number, and other inconveniences for the user.

Moreover, messages transmitted to mobile phones using SMS are not secured and can be intercepted. The second factor authentication codes can thus be stolen and be inappropriately used by third parties without knowledge by the user until possibly at a later juncture when the user receives a statement of transactions. It has also been known for hackers to use social engineering techniques to have 2FA codes redirected to alternative phone numbers.

In addition, messages transmitted using SMS may experience lag, leading to delays to the authentication process and frustrating instances when entire transactions need to be repeated as the lag leads to nullification of the transactions.

Finally, as modern smartphones are typically used for both browsing email and for receiving SMS, a lost or stolen phone (before intervention by the user) becomes a huge personal security risk since all accounts for which the email address is the key can be compromised as the phone can receive the authentication codes.

SUMMARY OF INVENTION

In a first aspect, there is provided a method for carrying out two factor authentication using augmented reality or virtual reality. The method comprises:

initiating, at a user device, a payment authorisation request;
receiving, from an issuer server in response to the payment authorisation request, a notification message to retrieve an authentication code generated at the issuer server;
rendering, at the user device, an augmented reality environment or a virtual reality environment on a display to depict an authentication object associated with the authentication code;
receiving, from the issuer server, the authentication code;
detecting, at the user device, a user interaction with the authentication object; and
decoding, at the user device, in response to the detected user interaction, the authentication object to display the authentication code.

In a second aspect, there is provided a user device for carrying out two factor authentication using augmented reality or virtual reality. The user device comprises one or more electronic processing devices that are configured to:

initiate a payment authorisation request;
receive, from an issuer server in response to the payment authorisation request, a notification message to retrieve an authentication code generated at the issuer server;
render an augmented reality environment or a virtual reality environment on a display to depict an authentication object associated with the authentication code;
receive, from the issuer server, the authentication code;
detect a user interaction with the authentication object; and
decode, in response to the detected user interaction, the authentication object to display the authentication code.

In a final aspect, there is provided a non-transitory computer readable storage medium embodying thereon a program of computer readable instructions which, when executed by one or more processors of a user device in communication with an issuer server, cause the user device to perform a method for carrying out two factor authentication using augmented reality or virtual reality. The method is embodied in the steps of:

initiating a payment authorisation request;
receiving, from an issuer server in response to the payment authorisation request, a notification message to retrieve an authentication code generated at the issuer server;
rendering an augmented reality environment or a virtual reality environment on a display to depict an authentication object associated with the authentication code;
receiving, from the issuer server, the authentication code;
detecting a user interaction with the authentication object; and
decoding, in response to the detected user interaction, the authentication object to display the authentication code.

BRIEF DESCRIPTION OF THE DRAWINGS

Preferred embodiments of the invention are hereafter described, by way of non-limiting example only, with reference to the accompanying drawings, in which.

DETAILED DESCRIPTION OF EMBODIMENTS OF THE INVENTION

Figure 1:
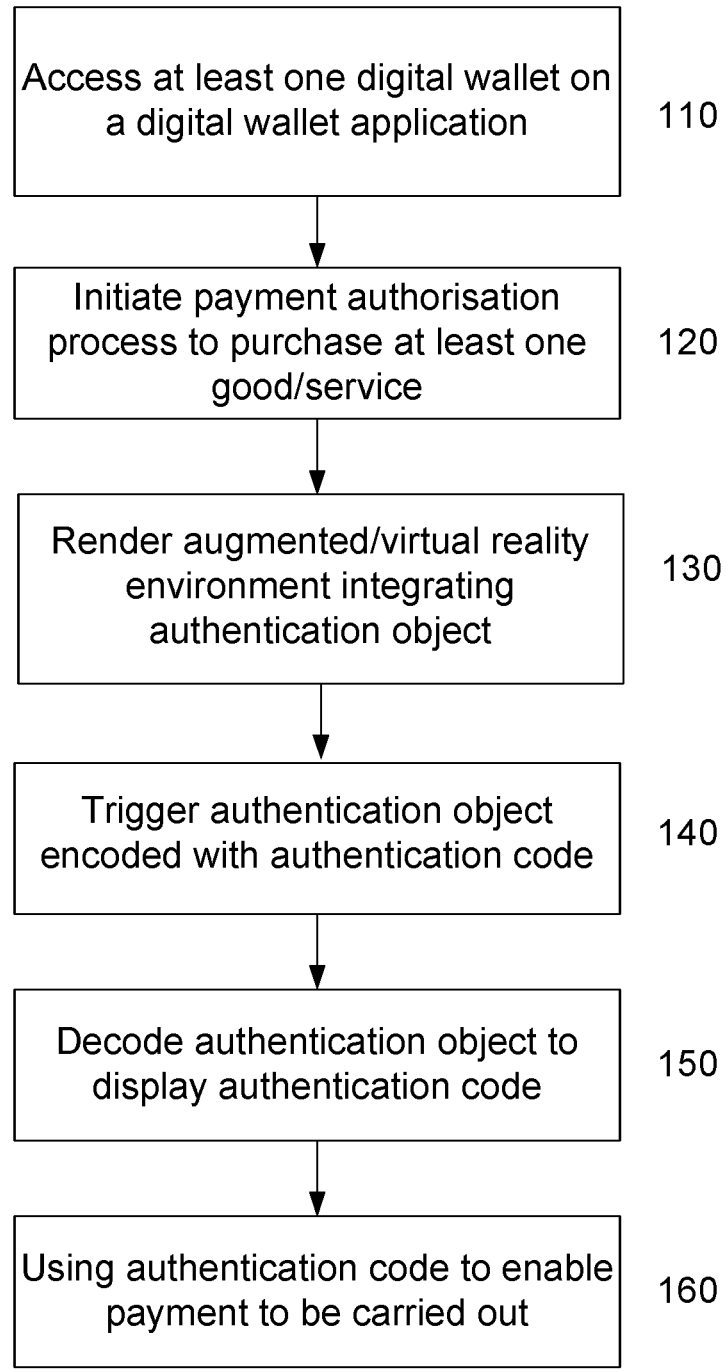
FIG. 1 is a flow chart of an example of a method for carrying out two factor authentication using augmented reality.

An example of a method for carrying out two factor authentication using augmented/virtual reality will now be described with reference to FIG. 1.

At step 110, a user initiates a request to a user device to access a digital wallet application installed on the user device in order to retrieve user account information, the user device being responsive to the request to selectively provide user account information to one or more electronic processing devices. The electronic processing devices may then receive user account information from the user device. Typically, the digital wallet application is configured to verify the user, possibly using biometric information (for example, finger prints, a voice print, an image of the user and so forth) and/or by inputting a PIN associated with the digital wallet application, to selectively provide the user account information. In this regard, the digital wallet application may prompt the user to provide verification information, selectively authenticate the user using the verification information and provide access to the user account information in response to successful verification. The user provides the PIN to the digital wallet application which verifies the PIN typically at a remote server where the user security details are stored. If the PIN is verified as correct, the user is authenticated as being the owner of the digital wallet application and in response the digital wallet application initiates a payment authorization process to purchase a good/service to be carried out at step 120. It should be appreciated that other manners of initiating the payment authorization process is also possible subsequent to authentication of the user, for example, via a mobile banking application, via a merchant application, via a mobile loans application and so forth.

At step 130, the user device renders an augmented reality environment or a virtual reality environment within either the digital wallet application or within another software application, such as an application provided by a merchant, for purchase of the good/service. An authentication object is integrated within the augmented reality or virtual reality environment, and may be one of many graphical elements within the augmented reality or virtual reality environment. In addition, the authentication object is encoded with an associated authentication code which is transmitted to the user device. The authentication object can be a pre-defined object selected by the user. For example, if the merchant has a group of cartoon characters (for example, a rabbit, a duck, a pig, a coyote, a cat, a mouse etc) which are associated with the merchant, the user can select the user's pre-selected (for example, during an installation set-up process of the merchant application on the user device) cartoon character (for example, the coyote) to be the authentication object. This process of selecting the authentication object can be carried out, for example, on an ad-hoc basis, at a point of first installation of the digital wallet application or merchant software application, whenever there is an update of the digital wallet application or merchant software application, and so forth.

The augmented/virtual reality environment can be provided in a manner whereby a selection of the authentication object in the augmented/virtual reality environment by the user is carried out in a gamified manner. For instance, a "challenge" can be posed to the user before the user is able to select the authentication object. The "challenge" can be, for example, a sequential random series of performances depicting each of the group of cartoon characters which are associated with the merchant. The user can then select the coyote character when the coyote character is performing in the augmented/virtual reality environment.

By selecting/interacting with the authentication object, the authentication object is triggered to provide the authentication code at step 140. At step 150, the correctly selected authentication object is decoded to display the authentication code. Once the authentication code is depicted, it can be input as a second factor authentication code to enable payment to be carried out in the desired manner at step 160.

Accordingly, the above described method provides a number of advantages.

Embodiments of the present invention incorporate use of augmented reality or virtual reality environments to aid users when carrying out two factor authentication. However, there are differences in relation to how two factor authentication is carried out compared to current processes.

Firstly, unlike authentication codes which are transmitted using SMS, the authentication code is not stored on the user device. Thus, unauthorised access to the authentication code is restricted and transactions have a less detectable digital trail. Furthermore, access to the software application being used to render the augmented/virtual reality environment can be restricted using for example, PINs, biometric information, verification challenges and so forth. This further restricts unauthorised access to the authentication code. In addition, the gamification approach to trigger the authentication object in order to obtain the authentication code can also provide a more desirable experience for users compared to merely receiving an SMS with the authentication code. Moreover, as the authentication code is only accessible via the software application, unauthorised interception of the authentication code when the authentication code is transmitted from an issuer server is more difficult compared to interception of an SMS message. Plus, since the software application is not associated with a mobile number in order to function in a desired manner, the user does not need to update changes to the mobile number to the issuer in relation to carrying out transactions. In addition, software applications which provide an augmented/virtual reality environment can obtain an alternative revenue stream in relation to enabling delivery of the authentication code for users. Finally, since the authentication code is deleted from the user device when the augmented/virtual reality environment is closed, unauthorised access to the authentication code is prevented and there is also a lack of a digital trail on the user device for a transaction.

Figure 2:
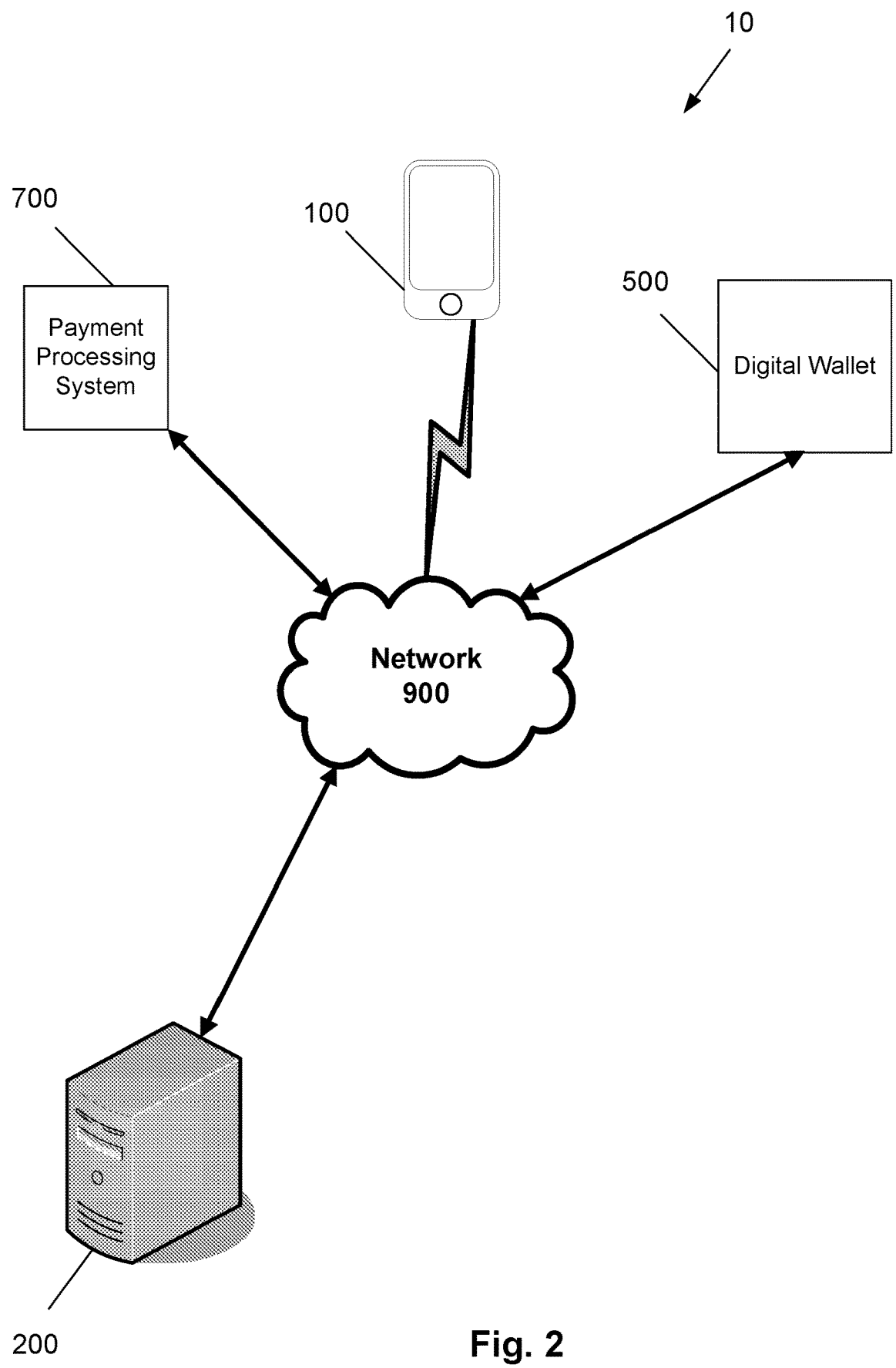
FIG. 2 is a schematic representation of an example of a system for carrying out two factor authentication using augmented reality.

An example of a system 10 for carrying out two factor authentication in an augmented/virtual reality environment will now be described with reference to FIG. 2.

In this example, the system 10 includes one or more user devices 100 running a payment application such as a digital wallet application and/or a merchant application, a communications network 900, an issuer server 200, and a payment processing system 700.

The communications network 900 can be of any appropriate form, such as the Internet and/or a number of local area networks (LANs). It will be appreciated that the configuration shown in FIG. 2 is for the purpose of example only, and in practice the user devices 100, the issuer server 200, and payment processing device 700 can communicate via any appropriate mechanism, such as via wired or wireless connections, including, but not limited to mobile networks, private networks, such as an 802.11 network, the Internet, LANs, WANs, or the like, as well as via direct or point-to-point connections, such as Bluetooth, or the like.

For the purpose of illustration, it is assumed that the method for carrying out two factor authentication using augmented/virtual reality is performed at least in part using one or more electronic processing devices forming part of the user device 100 (such as, for example, mobile phones, portable computers, tablet computers, or the like) and forming part of the issuer server 200. The payment processing system 700 may include a number of processing devices associated with each of an issuer, acquirer, card network and payment gateway, or alternatively, the payment processing system 700 may be any one or more of these entities and this will be discussed further below. A digital wallet provider 500 can be, for example, Mastercard™ International Incorporated which provides a MasterPass™ digital wallet.

User Device 100

Figure 3:
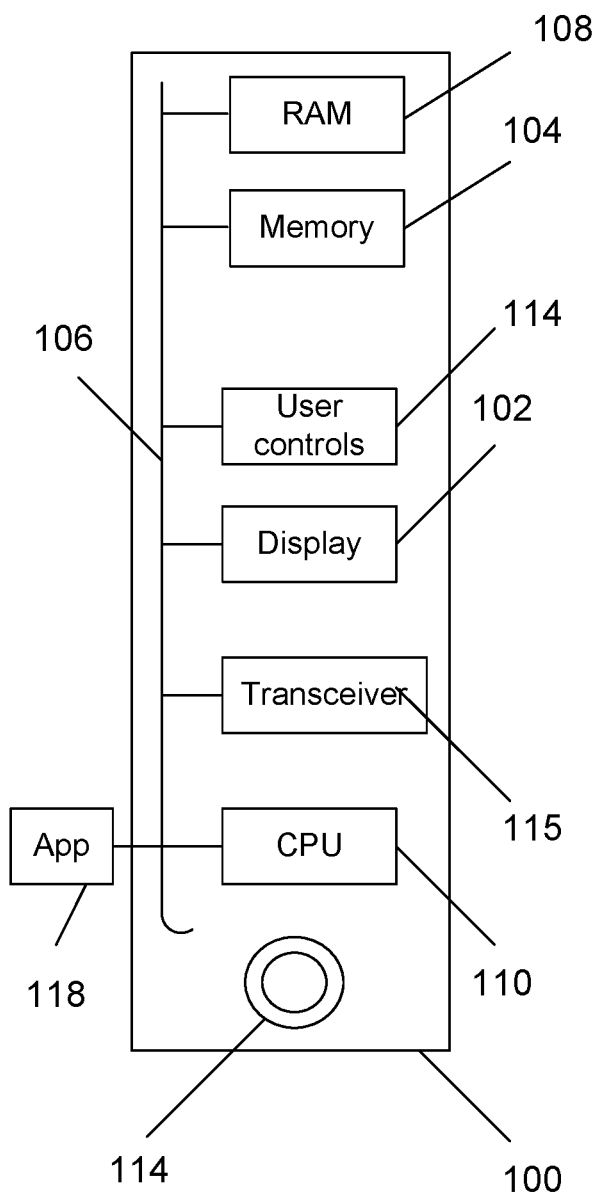
FIG. 3 is a schematic diagram showing components of a user device of the system shown in FIG. 2.

The user device 100 is a handheld computer device such as a smart phones or a PDA such as one manufactured by Apple™, LG™, HTC™, BlackBerry™, Samsung™, Huawei™, Asus™, or Motorola™. The user device 100 can also include a mobile computer such as a tablet computer, and wearable digital devices like smartwatches. An exemplary embodiment of the user device 100 is shown in FIG. 3. As shown, the device 100 includes the following components in electronic communication via a bus 106:

1. a display 102;
2. non-volatile memory 104;
3. random access memory ("RAM") 108;
4. N processing components 110;
5. a transceiver component 115 that includes N transceivers; and
6. user controls 114.

Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 102 generally operates to provide a presentation of content to a user, and may be realized by any of a variety of displays (e.g., CRT, LCD, HDMI, micro-projector and OLED displays). And in general, the non-volatile memory 104 functions to store (e.g., persistently store) data and executable code including code that is associated with the functional components of a browser component and a digital wallet application (App) or merchant App 118. In some embodiments, for example, the non-volatile memory 104 includes bootloader code, modem software, operating system code, file system code, and code to facilitate the implementation of one or more portions of the digital wallet App 118 or merchant App 118 as well as other components well known to those of ordinary skill in the art that are not depicted for simplicity.

In many implementations, the non-volatile memory 104 is realized by flash memory (e.g., NAND or ONENAND memory), but it is certainly contemplated that other memory types may be utilized as well. Although it may be possible to execute the code from the non-volatile memory 104, the executable code in the non-volatile memory 104 is typically loaded into RAM 108 and executed by one or more of the N processing components 110.

The N processing components 110 in connection with RAM 108 generally operate to execute the instructions stored in non-volatile memory 104 to effectuate the functional components. As one of ordinarily skill in the art will appreciate, the N processing components 110 may include a video processor, modem processor, DSP, graphics processing unit (GPU), and other processing components.

The transceiver component 115 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Issuer Server 200

Figure 4:
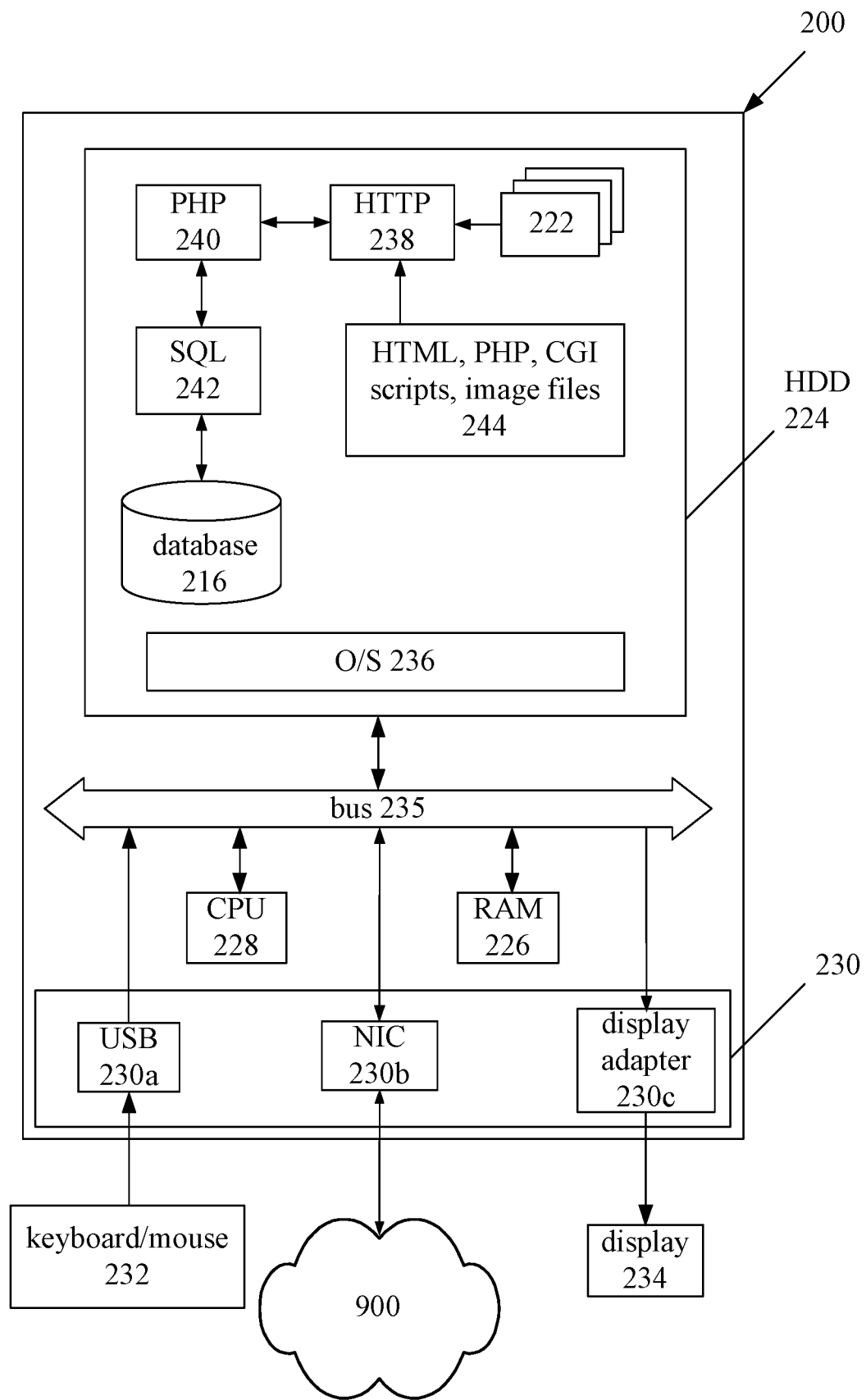
FIG. 4 is a schematic diagram showing components of an issuer server of the system shown in FIG. 2.

The issuer server 200 is in communication with a database 216, as shown in FIG. 4. The issuer server 200 is able to communicate within the system 10 over a communications network 900 using standard communication protocols.

The components of the issuer server 200 can be configured in a variety of ways. The components can be implemented entirely by software to be executed on standard computer server hardware, which may comprise one hardware unit or different computer hardware units distributed over various locations, some of which may require the communications network 900 for communication. A number of the components or parts thereof may also be implemented by application specific integrated circuits (ASICs) or field programmable gate arrays.

In the example shown in FIG. 4, the issuer server 200 is a commercially available server computer system based on a 32 bit or a 64 bit Intel architecture, and the processes and/or methods executed or performed by the issuer server 200 are implemented in the form of programming instructions of one or more software components or modules 222 stored on non-volatile (e.g., hard disk) computer-readable storage 224. At least parts of the software modules 222 could alternatively be implemented as one or more dedicated hardware components, such as application-specific integrated circuits (ASICs) and/or field programmable gate arrays (FPGAs).

The issuer server 200 includes at least one or more of the following standard, commercially available, computer components, all interconnected by a bus 235:

1. random access memory (RAM) 226;
2. at least one computer processor 228, and
3. external computer interfaces 230:
   a. universal serial bus (USB) interfaces 230a (at least one of which is connected to one or more user-interface devices, such as a keyboard, a pointing device (e.g., a mouse 232 or touchpad),
   b. a network interface connector (NIC) 230b which connects the computer system 202 to a data communications network, such as the Internet 900; and
   c. a display adapter 230c, which is connected to a display device 234 such as a liquid-crystal display (LCD) panel device.

The issuer server 200 includes a plurality of standard software modules, including:
1. an operating system (OS) 236 (e.g., Linux or Microsoft Windows);
2. web server software 238 (e.g., Apache, available at http://www.apache.org);
3. scripting language modules 240 (e.g., personal home page or PHP, available at http://www.php.net, or Microsoft ASP); and
4. structured query language (SQL) modules 242 (e.g., MySQL, available from http://www.mysql.com), which allow data to be stored in and retrieved/accessed from an SQL database 216.

Together, the web server 238, scripting language 240, and SQL modules 242 provide the issuer server 200 with the general ability to allow users of the Internet 900 with user devices 100 equipped with standard web browser software and/or a digital wallet App to access the issuer server 200 and in particular to provide data to and receive data from the database 216. It will be understood by those skilled in the art that the specific functionality provided by the issuer server 200 to such users is provided by scripts accessible by the web server 238, including the one or more software modules 222 implementing the processes performed by the issuer server 200, and also any other scripts and supporting data 244, including markup language (e.g., HTML, XML) scripts, PHP (or ASP), and/or CGI scripts, image files, style sheets, and the like.

The boundaries between the modules and components in the software modules 222 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the issuer server 200 may be executed by a module (of software modules 222) or a portion of a module. The processes may be embodied in a non-transient machine-readable and/or computer-readable medium for configuring a computer system to execute the method. The software modules may be stored within and/or transmitted to a computer system memory to configure the issuer server 200 to perform the functions of the module.

The issuer server 200 normally processes information according to a program (a list of internally stored instructions such as a particular application program and/or an operating system) and produces resultant output information via input/output (I/O) devices 230. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Payment Processing System 700

Figure 5:
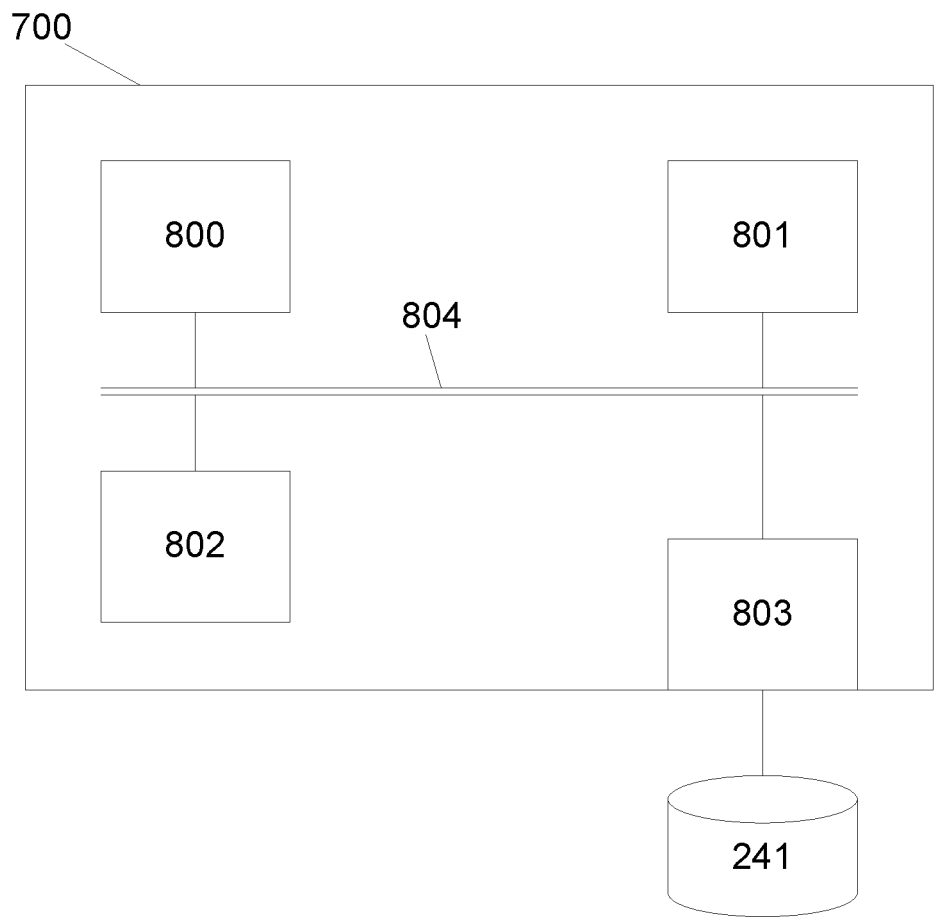
FIG. 5 is a schematic diagram showing components of an example payment processing device of the system shown in FIG. 2.

A suitable payment processing system 700 for use in the system described in any of the above examples is shown in FIG. 5.

In this example, the payment processing system 700 is a server (though in practice, the system 700 will comprise multiple such servers) that includes at least one microprocessor 800, a memory 801, an optional input/output device 802, such as a display, keyboard, touchscreen and the like, and an external interface 803, interconnected via a bus 804 as shown. In this example the external interface 803 can be utilised for connecting the payment processing system 700 to peripheral devices in the system 10, such as the issuer server 200, the communication networks 900, databases 241, other storage devices, or the like. Although a single external interface 803 is shown, this is for the purpose of example only, and in practice multiple interfaces using various methods (e.g. Ethernet, serial, USB, wireless or the like) may be provided.

In use, the microprocessor 800 executes instructions in the form of applications software stored in the memory 801 to allow communication with the payment processing system 700, for example to process payment required at the payment processing system 700. The applications software may include one or more software modules, and may be executed in a suitable execution environment, such as an operating system environment, or the like.

Accordingly, it will be appreciated that the payment processing system 700 may be formed from any suitable processing system, such as any electronic processing device, including a microprocessor, microchip processor, logic gate configuration, firmware optionally associated with implementing logic such as an FPGA (Field Programmable Gate Array), or any other electronic device, system or arrangement. Thus, in one example, the processing system is a standard processing system such as an Intel Architecture based processing system, which executes software applications stored on non-volatile (e.g., hard disk) storage, although this is not essential.

In other examples, such as described above, the payment processing system 700 is formed of multiple computer systems interacting, for example, via a distributed network arrangement. As distributed networking is known in the art, it will not be described further in more detail.

In particular, the payment processing system 700 may include or be in communication with a number of processing systems associated with each of an issuer, acquirer, card network and payment gateway, or alternatively, the payment system may be any one or more of these entities.

In one example, the payment processing system 700 sends the user account information and payment information to the merchant's acquirer. The acquirer then requests that the card network get an authorization from the user's issuing bank. The card network submits the transaction to the issuer for authorization and the issuing bank then authorizes the transaction if the account has sufficient funds to cover the amount payable. Optionally, additional processing steps may take place before the transaction is authorised, such as checking whether the payment instrument being used for the transaction is permitted for use with the particular merchant or type of merchant, or determining whether the transaction is potentially fraudulent. Such additional processing steps may be undertaken by the issuer or by a transaction processor in communication with the issuer's systems. The issuer, on approval of the transaction, then routes payment to the acquirer (in subsequent settlement and clearance processes as known in the art) who then deposits the payment into the merchant's account.

Figure 6A:
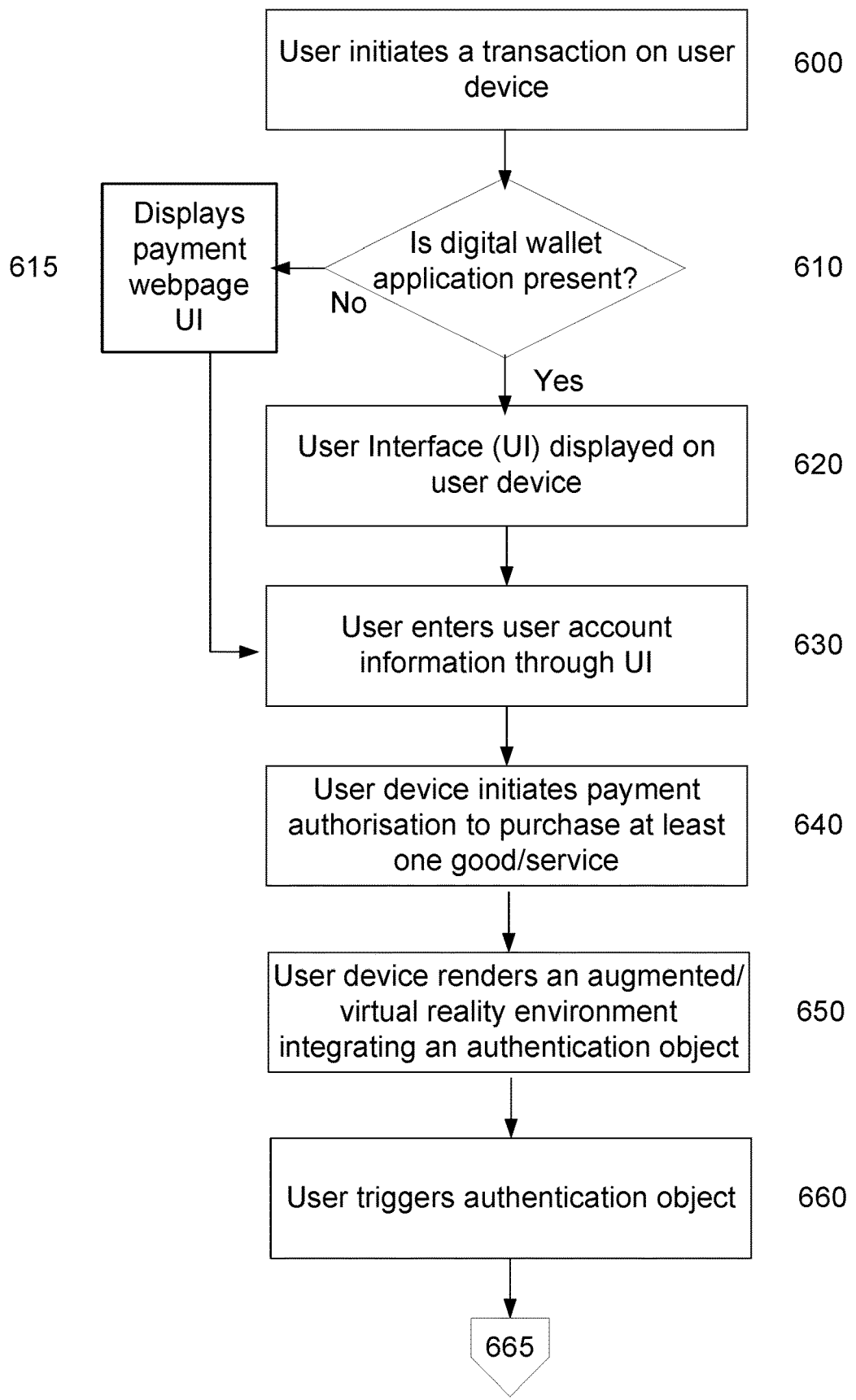
FIGS. 6A, and 6B are flow charts of a specific example of a method for carrying out two factor authentication using augmented reality.
Figure 6B:
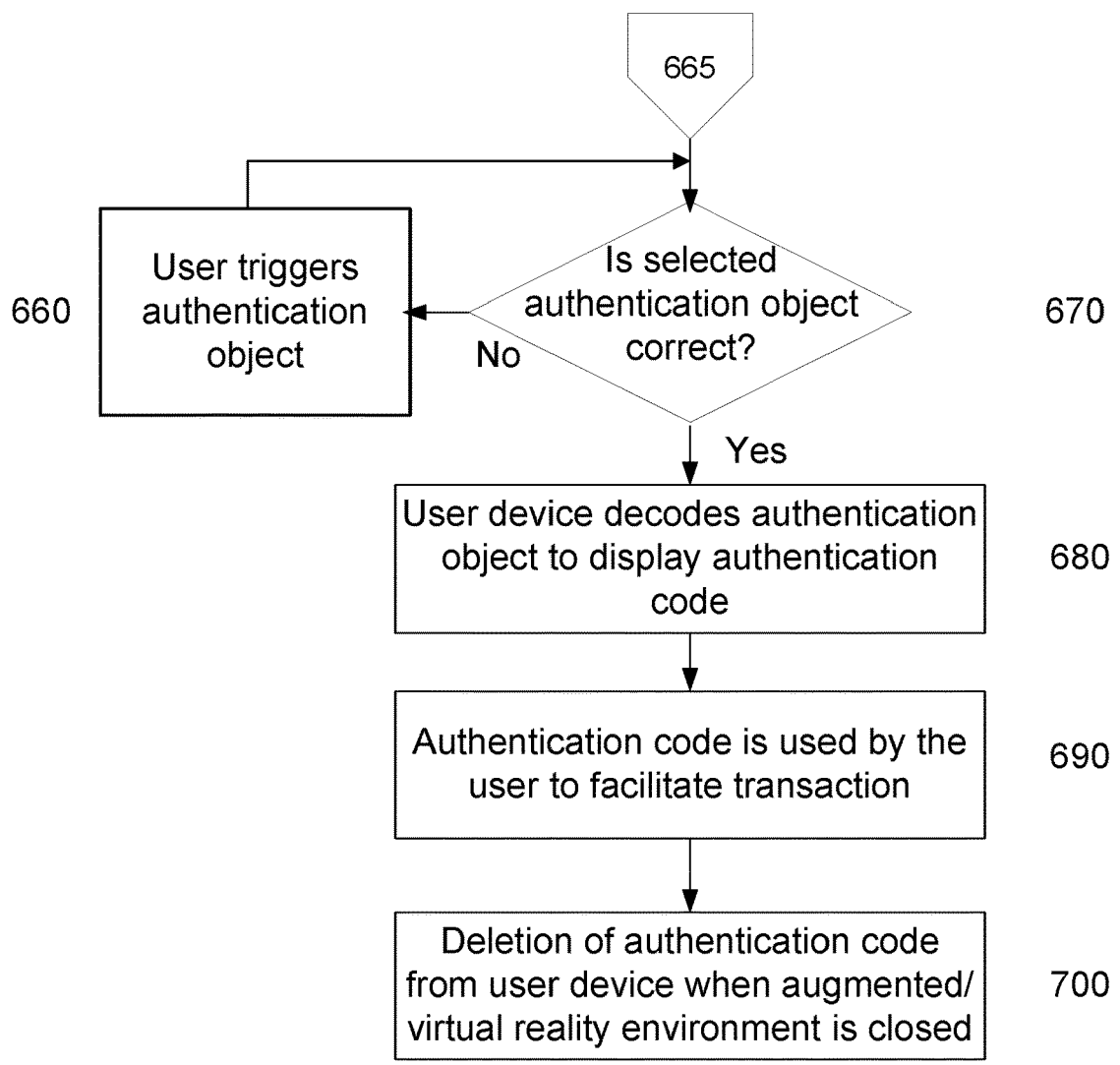

To illustrate further features of preferred practical implementations of the method, a detailed example of a method for carrying out two factor authentication using augmented/virtual reality will now be described with reference to FIG. 6.

At step 600, a user desires to perform a transaction involving the purchase of goods and/or services provided by a merchant. The user need not be at a location of the merchant's establishment.

At step 610, the user device determines whether a digital wallet application (such as MasterPass™ by Mastercard™, or a digital wallet application of a bank or other issuer) is installed on the user device. If the digital wallet application is not installed on the user device, a payment webpage UI is displayed at step 615 so as to allow the user to input account information via the UI at step 630. If the digital wallet application is installed on the user device, a payment UI is then displayed on the user device at step 620 so as to allow the user to input account information via the UI at step 630.

At step 640, once the user is authenticated as being the owner of the digital wallet application, the digital wallet application subsequently initiates a payment authorization process to purchase a good/service. It should be appreciated that other manners of initiating the payment authorization process is also possible subsequent to authentication of the user, for example, via a mobile banking application, via a merchant application, via a mobile loans application and so forth.

At step 650, the user device renders an augmented/virtual reality environment within either the digital wallet application or within another software application, such as an application provided by a merchant, for purchase of the good/service. An authentication object is integrated within the augmented/virtual reality environment and may be one of many graphical elements within the augmented/virtual reality environment. In addition, the authentication object is encoded with an associated authentication code which is transmitted to the user device. The authentication object can be a pre-defined object selected by the user. For example, if the merchant has a group of cartoon characters (for example, a rabbit, a duck, a pig, a coyote, a cat, a mouse etc) which are associated with the merchant, the user can select the user's pre-selected (for example, during an installation set-up process of the merchant application on the user device) cartoon character (for example, the coyote) to be the authentication object. This process of selecting the authentication object can be carried out, for example, on an ad-hoc basis, at a point of first installation of the digital wallet application or merchant software application, whenever there is an update of the digital wallet application or merchant software application, and so forth.

The augmented/virtual reality environment can be provided in a manner whereby a selection of the authentication object in the augmented/virtual reality environment by the user is carried out in a gamified manner. For instance, a "challenge" can be posed to the user before the user is able to select the authentication object. The "challenge" can be, for example, a sequential random series of performances depicting each of the group of cartoon characters which are associated with the merchant. The user can then select the coyote character when the coyote character is performing in the augmented/virtual reality environment.

By selecting/interacting with the authentication object, the authentication object is triggered to provide the authentication code at step 660. At step 670, a determination is made whether the correctly selected authentication object is decoded to display the authentication code at step 680. If the user selected an incorrect authentication object, the user will be prompted to reselect the authentication object at step 660 for a predetermined number of instances.

Once the authentication code is depicted, it can be input as a second factor authentication code to enable payment to be carried out in the desired manner at step 690. At step 700, subsequently, either after a pre-determined duration or at a choice of the user, the authentication code is deleted from the user device when the augmented/virtual reality environment is closed.

In the aforementioned embodiments, unlike authentication codes which are transmitted using SMS, the authentication code is not stored on the user device. Thus, unauthorised access to the authentication code is restricted and transactions have a less detectable digital trail. Furthermore, access to the software application being used to render the augmented/virtual reality environment can be restricted using for example, PINs, biometric information, verification challenges and so forth. This further restricts unauthorised access to the authentication code. In addition, the gamification approach to trigger the authentication object in order to obtain the authentication code can also provide a more desirable experience for users compared to merely receiving an SMS with the authentication code. Moreover, as the authentication code is only accessible via the software application, unauthorised interception of the authentication code when the authentication code is transmitted from an issuer server is more difficult compared to interception of an SMS message. Plus, since the software application is not associated with a mobile number in order to function in a desired manner, the user does not need to update changes to the mobile number to the issuer in relation to carrying out transactions. In addition, software applications which provide an augmented/virtual reality environment can obtain an alternative revenue stream in relation to enabling delivery of the authentication code for users. Finally, since the authentication code is deleted from the user device when the augmented/virtual reality environment is closed, unauthorised access to the authentication code is prevented and there is also a lack of a digital trail on the user device for a transaction.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. A computer-implemented method for carrying out two factor authentication using augmented reality or virtual reality, the method comprising:

accessing, at a user device, at least one digital wallet stored on an application interface of a digital wallet provider on one or more servers of the digital wallet provider, wherein the one or more servers are coupled over one or more networks to the user device;

initiating, at the user device, a payment authorization request;

receiving, from an issuer server in response to the payment authorization request, a notification message to retrieve an authentication code generated at the issuer server;

rendering, at the one or more servers of the digital wallet provider, an augmented reality environment or a virtual reality environment on a display to depict an authentication object associated with the authentication code, wherein the augmented reality environment or the virtual reality environment is configured to be restricted within the application interface;

receiving, from the issuer server, the authentication code in the augmented reality environment or the virtual reality environment;

detecting, at the user device, a user interaction with the authentication object in the augmented reality environment or virtual reality environment; and decoding, at the user device, in response to the detected user interaction, the authentication object to display the authentication code.

2. The method of claim 1, further comprising:
rendering, at the user device, the authentication object for interaction with the user; and
deleting, at the user device, the authentication code.

3. The method of claim 1, wherein the depicted authentication object is in a form predefined by the user.

4. The method of claim 1, wherein the authentication code is a one-time password (OTP).

5. The method of claim 1, wherein the augmented reality environment or the virtual reality environment is rendered a merchant application.

6. A user device for carrying out two factor authentication using augmented reality or virtual reality, the user device comprising one or more electronic processing devices that are configured to:

accessing, at a user device, at least one digital wallet stored on an application interface of a digital wallet provider on one or more servers of the digital wallet provider, wherein the one or more servers are coupled over one or more networks to the user device;

initiate, at the user device, a payment authorization request;

receive, from an issuer server in response to the payment authorization request, a notification message to retrieve an authentication code generated at the issuer server;

render, at the one or more servers of the digital wallet provider, an augmented reality environment or a virtual reality environment on a display to depict an authentication object associated with the authentication code, wherein the augmented reality environment or the virtual reality environment is configured to be restricted within the application interface;

receive, from the issuer server, the authentication code in the augmented reality environment or the virtual reality environment;

detect a user interaction with the authentication object; and decode, in response to the detected user interaction, the authentication object to display the authentication code.

7. The user device of claim 6, wherein the one or more electronic processing devices are further configured to:
render the authentication object for interaction with the user; and
delete the authentication code.

8. The user device of claim 6, wherein the depicted authentication object is predefined by the user.

9. The user device of claim 6, wherein the authentication code is a one-time password (OTP).

10. The user device of claim 6, wherein the augmented reality environment or the virtual reality environment is rendered within a merchant application.

11. A non-transitory computer readable storage medium embodying thereon a program of computer readable instructions which, when executed by one or more processors of a user device in communication with an issuer server, cause the user device to:

accessing, at a user device, at least one digital wallet stored on an application interface of a digital wallet provider on one or more servers of the digital wallet provider, wherein the one or more servers are coupled over one or more networks to the user device;

initiate, at the user device, a payment authorization request;

receive, from an issuer server in response to the payment authorization request, a notification message to retrieve an authentication code generated at the issuer server;

render, at the one or more servers of the digital wallet provider, an augmented reality environment or a virtual reality environment on a display to depict an authentication object associated with the authentication code, wherein the augmented reality environment or the virtual reality environment is configured to be restricted within the application interface;

receive, from the issuer server, the authentication code in the augmented reality environment or the virtual reality environment;

detect a user interaction with the authentication object; and decode, in response to the detected user interaction, the authentication object to display the authentication code.

12. The non-transitory computer readable storage medium of claim 11, wherein the program of computer readable instructions, when executed by the one or more processors, further cause the user device to:
render the authentication object for interaction with the user; and
delete the authentication code.

13. The non-transitory computer readable storage medium of claim 11, wherein the depicted authentication object is predefined by the user.

14. The non-transitory computer readable storage medium of claim 11, wherein the authentication code is a one-time password (OTP).

15. The non-transitory computer readable storage medium of claim 11, wherein the augmented reality environment or the virtual reality environment is rendered within a merchant application.

* * * * *